(12) United States Patent
Tanaka

(10) Patent No.: US 7,832,260 B2
(45) Date of Patent: Nov. 16, 2010

(54) ABNORMALITY DIAGNOSIS APPARATUS FOR INTERNAL COMBUSTION ENGINE

(75) Inventor: Toshihiko Tanaka, Kariya (JP)

(73) Assignee: Denso Corporation, Kariya (JP)

( * ) Notice: Subject to any disclaimer, the term of this patent is extended or adjusted under 35 U.S.C. 154(b) by 317 days.

(21) Appl. No.: 12/194,802

(22) Filed: Aug. 20, 2008

(65) Prior Publication Data

US 2009/0055079 A1 Feb. 26, 2009

(30) Foreign Application Priority Data

Aug. 22, 2007 (JP) ............................. 2007-215401

(51) Int. Cl.
G01M 15/10 (2006.01)
(52) U.S. Cl. .............. 73/114.38; 73/114.48; 73/114.55; 73/114.72
(58) Field of Classification Search .............. 73/114.38, 73/114.45, 114.48, 114.52, 114.55, 114.69, 73/114.71, 114.72
See application file for complete search history.

(56) References Cited

U.S. PATENT DOCUMENTS 5,950,606 A 9/1999 Iida et al.
7,370,521 B1 * 5/2008 Sandmann et al. ........ 73/114.45
2009/0031704 A1 * 2/2009 Tanaka ......................... 60/276
2009/0031987 A1 * 2/2009 Tanaka ..................... 123/406.3

FOREIGN PATENT DOCUMENTS

JP 11-82117 3/1999
JP 2001-329894 11/2001

* cited by examiner

Primary Examiner—Eric S McCall
(74) Attorney, Agent, or Firm—Nixon & Vanderhye PC

(57) ABSTRACT

An abnormality diagnosis apparatus for an internal combustion engine includes an abnormality diagnosis unit, an other fuel contamination determination unit, and a misdiagnosis prohibition unit. The abnormality diagnosis unit determines whether there is an abnormality in a fuel system based on an output from an exhaust gas sensor mounted on an exhaust duct of the internal combustion engine. The other fuel contamination determination unit determines whether an other fuel contaminates a supply fuel supplied to the internal combustion engine. The misdiagnosis prohibition unit conducts one of (a) changing an abnormality determination condition for the abnormality diagnosis in the fuel system and (b) prohibiting the abnormality diagnosis in the fuel system, when the other fuel contamination determination unit determines that the other fuel contaminates the supply fuel.

5 Claims, 6 Drawing Sheets

MAP OF ABNORMALITY DETERMINATION VALUE CORRECTION COEFFICIENT

MAP OF OTHER FUEL CONTAMINATION RATIO

ABNORMALITY DIAGNOSIS APPARATUS FOR INTERNAL COMBUSTION ENGINE

CROSS REFERENCE TO RELATED APPLICATION

This application is based on and incorporates herein by reference Japanese Patent Application No. 2007-215401 filed on Aug. 22, 2007.

BACKGROUND OF THE INVENTION

1. Field of the Invention

The present invention relates to an abnormality diagnosis apparatus for an internal combustion engine, which apparatus determines whether there is an abnormality in a fuel system based on an output from an exhaust gas sensor mounted on an exhaust duct of the internal combustion engine.

2. Description of Related Art

For example, JP-A-2001-329894 (for example, P. 2) describes an air-fuel ratio control system that performs a abnormality diagnosis of a fuel system (for example, fuel injection valve, fuel pump) for an internal combustion engine. The air-fuel ratio control system establishes an air-fuel ratio feed-back correction amount for a feed-back control based on an output from an exhaust gas sensor (air-fuel ratio sensor, oxygen sensor), which is mounted on an exhaust pipe of an internal combustion engine, in order to cause an actual air-fuel ratio estimated based on exhaust gas to generally match with a target air-fuel ratio. Also, the air-fuel ratio control system learns a different amount from the target air-fuel ratio to the actual air-fuel ratio as a learning correction amount, and the air-fuel ratio control system controls a fuel injection quantity by using the air-fuel ratio feed-back correction amount and the learning correction amount. Thus, the air-fuel ratio control system determines whether there is the abnormality in the fuel system based on a total value of an air-fuel ratio feed-back correction amount and a learning correction amount.

The internal combustion engine includes a gasoline engine that uses gasoline or a diesel engine that uses light oil. Recently, there have been constructed more self-service gas stations, where a driver refuels a vehicle by himself or herself. Therefore, the driver may supply light oil to a vehicle having the gasoline engine by mistake. In the above case, the light oil is other fuel that is not usable for the gasoline engine. Also, bad fuel, which is intentionally made by mixing other fuel into gasoline, may be supplied to the vehicle. In the above, the other fuel for the gasoline engine may be light oil or kerosene. When the other fuel contaminates supply fuel, which is supplied to the engine, an air-fuel ratio of the mixture supplied to the engine or oxygen concentration in the exhaust gas changes, and thereby the output from the exhaust gas sensor may changes. Accordingly, the air-fuel ratio feed-back correction amount is changed in accordance with the above change.

However, as shown in JP-A-2001-329894 (for example, page 2), in the abnormality diagnosis of the fuel system by using the air-fuel ratio feed-back correction amount, when the contamination of the other fuel causes the air-fuel ratio feed-back correction amount to widely change, an abnormality determination parameter, which is based on the air-fuel ratio feed-back correction amount, may exceed an abnormality determination threshold value even when the fuel system operates in a normal state. Accordingly, there is a possibility of misdiagnosis for erroneously determining that there is the abnormality in the fuel system disadvantageously. In the above, the abnormality determination parameter may be a total value of the air-fuel ratio feed-back correction amount and the learning correction amount, for example.

SUMMARY OF THE INVENTION

The present invention is made in view of the above disadvantages. Thus, it is an objective of the present invention to address at least one of the above disadvantages.

To achieve the objective of the present invention, there is provided an abnormality diagnosis apparatus for an internal combustion engine, which apparatus includes an abnormality diagnosis unit, an other fuel contamination determination unit, and a misdiagnosis prohibition unit. The abnormality diagnosis unit determines whether there is an abnormality in a fuel system based on an output from an exhaust gas sensor mounted on an exhaust duct of the internal combustion engine. The other fuel contamination determination unit determines whether an other fuel contaminates a supply fuel, which is supplied to the internal combustion engine. The misdiagnosis prohibition unit conducts one of (a) changing an abnormality determination condition used in determination of whether there is the abnormality in the fuel system and (b) prohibiting the abnormality diagnosis unit from determining whether there is the abnormality in the fuel system, when the other fuel contamination determination unit determines that the other fuel contaminates the supply fuel.

BRIEF DESCRIPTION OF THE DRAWINGS

The invention, together with additional objectives, features and advantages thereof will be best understood from the following description, the appended claims and the accompanying drawings in which:

DETAILED DESCRIPTION OF PREFERRED EMBODIMENTS

Several embodiments are made by applying the present invention to a gasoline engine and is described with reference to accompanying drawings. The gasoline engine indicates an engine that uses gasoline as fuel.

First Embodiment

Figure 1:
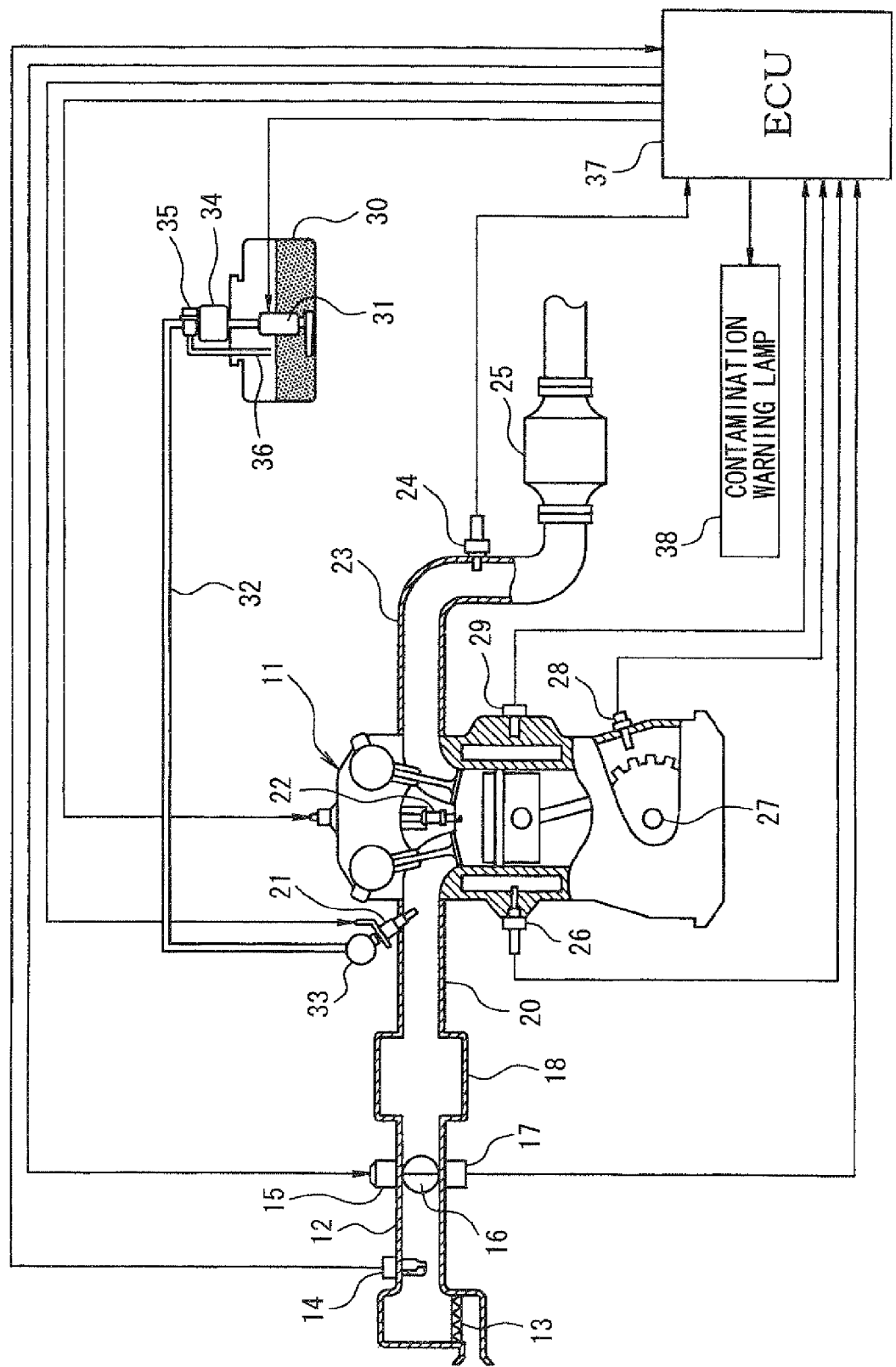
FIG. 1 is a schematic general configuration of an engine control system according to a first embodiment of the present invention.

The first embodiment of the present invention will be described with reference to FIGS. 1 to 6. Referring to FIG. 1, a general configuration of an engine control system is described.

An engine 11 is an internal combustion engine and is connected with an intake pipe 12. An air cleaner 13 is provided most upstream of the intake pipe 12, and an air flow meter 14 is provided to the intake pipe 12 downstream of the air cleaner 13 for detecting an intake air amount. A throttle valve 16, an opening of which is adjusted by a motor 15, is provided to the intake pipe 12 downstream of the air flow meter 14. Also, a throttle opening sensor 17 is provided to the intake pipe 12 downstream of the air flow meter 14 for detecting a throttle opening of the throttle valve 16.

Further, a surge tank 18 is provided to the intake pipe 12 downstream of the throttle valve 16, and the surge tank 18 is connected with an intake manifold 20 that introduces air to each cylinder of the engine 11. A fuel injection valve 21 is provided adjacently to an intake port of each cylinder of the intake manifold 20 for injecting fuel. Also, an ignition plug 22 is assembled to a cylinder head of the engine 11 for each cylinders and air-fuel mixture in the cylinder is ignited through spark discharge of each ignition plug 22.

An exhaust pipe 23 of the engine 11 is provided with an exhaust gas sensor 24 (for example, air-fuel ratio sensor, oxygen sensor) for obtaining (a) an air-fuel ratio or (b) a combustion state (rich/lean state) for the engine 11 based on exhaust gas, a catalytic converter 25, such as a three-way catalytic converter, is provided downstream of the exhaust gas sensor 24 such that the catalytic converter 25 purifies exhaust gas.

Also, the engine 11 has a cylinder block that is provided with a coolant temperature sensor 26 and a knock sensor 29. The coolant temperature sensor 26 senses temperature of a coolant, and the knock sensor 29 senses engine knocking. Also, there is provided a crank angle sensor 28 at an outer periphery of a crank shaft 27 such that the crank angle sensor 28 outputs a pulse signal when the crank shaft 27 rotates by a predetermined crank angle. A crank angle and an engine rotation speed are detected based on the output signal by the crank angle sensor 28.

A fuel pump 31 that pumps up fuel is provided inside a fuel tank 30 that stores fuel, that is gasoline. The fuel pumped by the fuel pump 31 is transmitted to a delivery pipe 33 through a fuel tube 32, and the fuel is distributed to the fuel injection valve 21 of each cylinder through the delivery pipe 33. The fuel tube 32 is connected with a filter 34 and with a pressure regulator 35 around the fuel pump 31, and the pressure regulator 35 controls discharge pressure of the fuel pump 31 at a predetermined pressure. Excessive fuel that exceeds the predetermined pressure is returned to the fuel tank 30 through a fuel return pipe 36.

The outputs from the above various sensors are inputted into a control circuit (ECU) 37. The ECU 37 is configured to mainly include a microcomputer and executes various engine control programs stored in a ROM (storage medium) such that the ECU 37 controls a fuel injection quantity of each of the fuel injection valves 21 and ignition timing of each of the ignition plugs 22 in accordance with an engine operational state.

In the above case, when a predetermined air-fuel ratio F/B control execution condition is established, the ECU 37 executes an air-fuel ratio F/B control for correcting the fuel injection quantity of the fuel injection valve 21. Specifically, in the air-fuel ratio F/B control, the ECU 37 computes an air-fuel ratio F/B correction amount based on the output by the exhaust gas sensor 24 in order to cause the air-fuel ratio estimated based on the exhaust gas to correspond to or match with a target air-fuel ratio. Then, the ECU 37 uses the above air-fuel ratio F/B correction amount to correct the fuel injection quantity of the fuel injection valve 21. As above, the ECU 37 serves as air-fuel ratio F/B control means. Note that "F/B" indicates "feed back" in the present specification.

Figure 3:
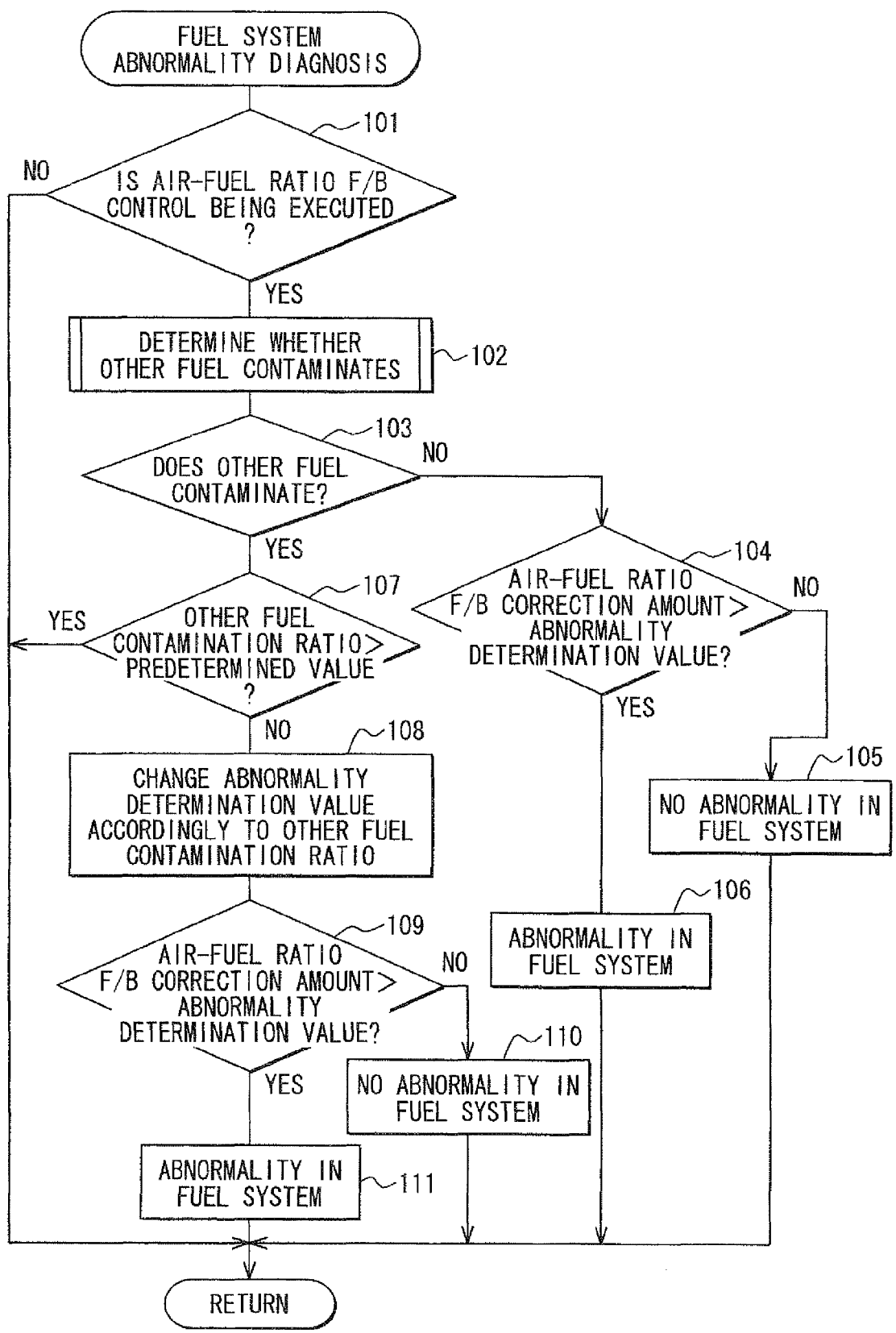
FIG. 3 is a flow chart for explaining a process flow of a fuel system abnormality diagnosis routine according to the first embodiment.
Figure 4:
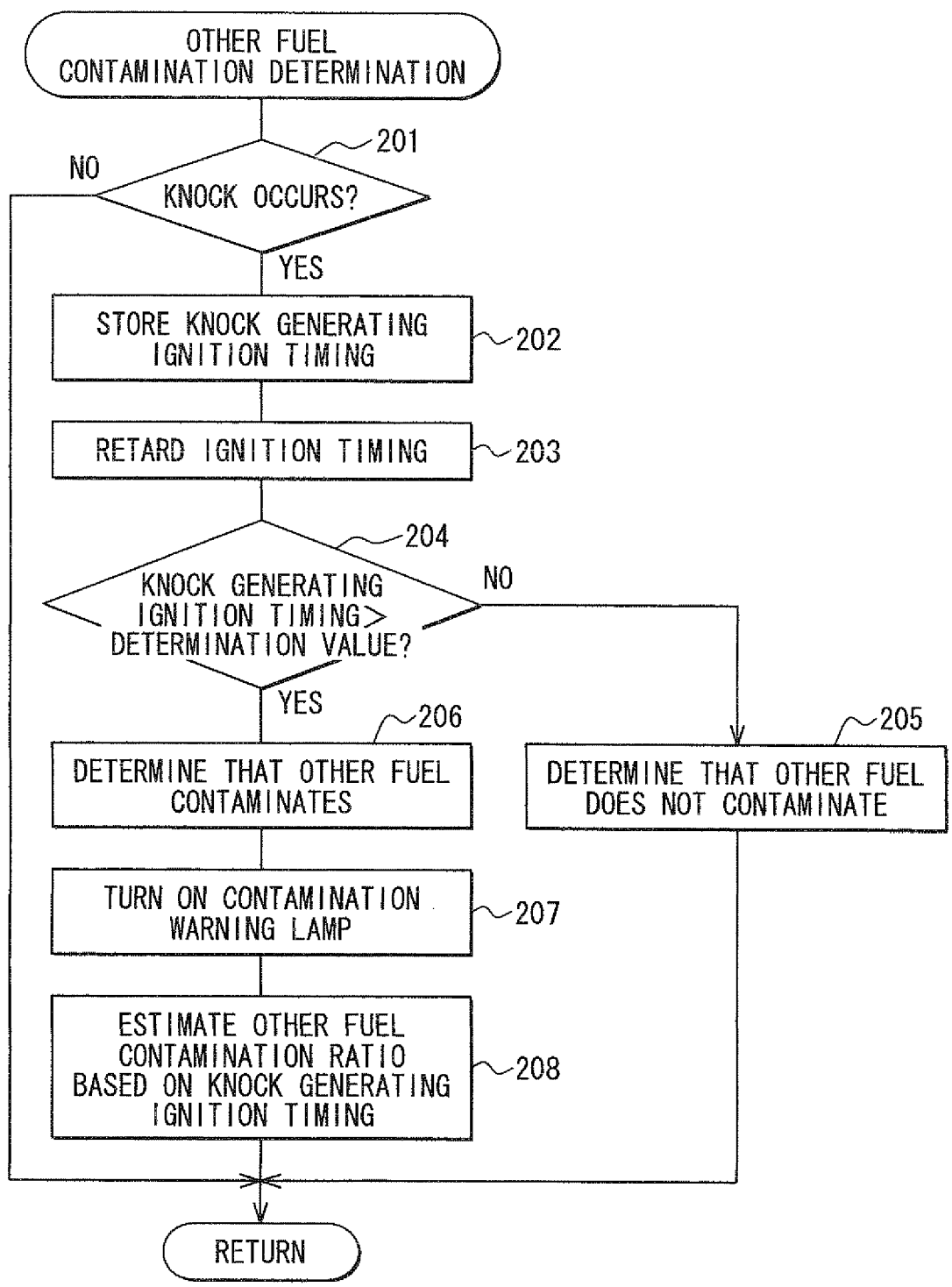
FIG. 4 is a flow chart for explaining a process flow of an other fuel contamination determination routine.
Figure 5:
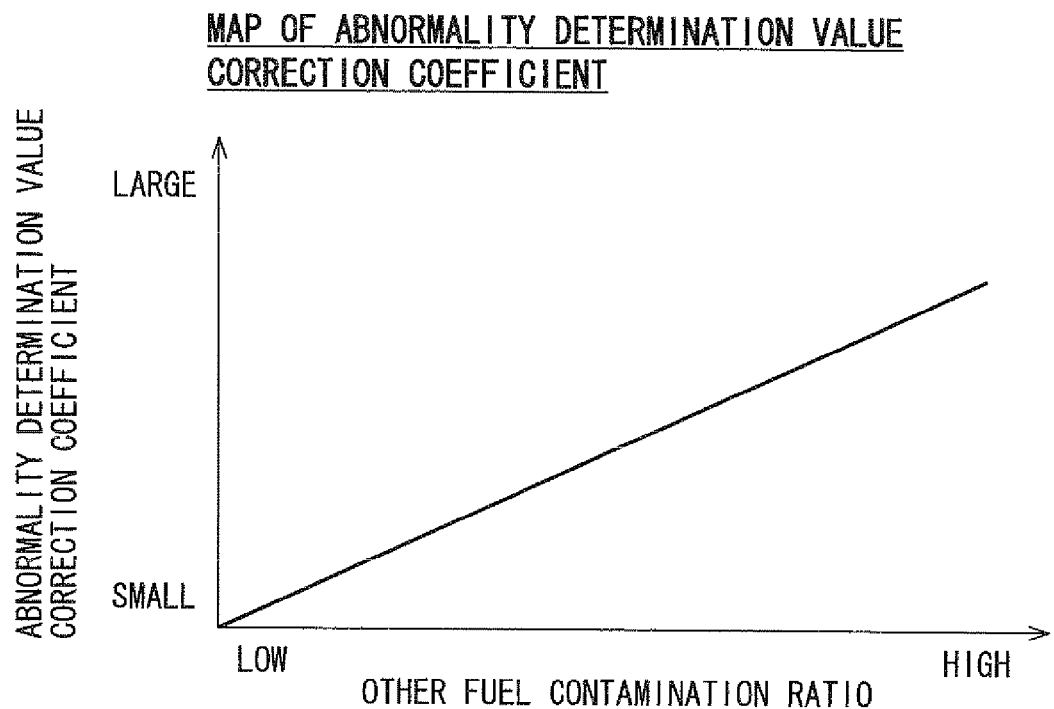
FIG. 5 is a diagram illustrating a concept of one example of a map for a abnormality determination value correction coefficient.

Also, the ECU 37 performs a fuel system abnormality diagnosis for determining whether there is the abnormality in a fuel system (the fuel injection valve 21, the fuel tank 30, the fuel pump 31, etc) by comparing the above air-fuel ratio F/B correction amount with a predetermined abnormality determination value through the execution of routines shown in FIGS. 3 and 4.

When an unusable other fuel contaminates a supply fuel (gasoline), which is supplied to the engine 11, the air-fuel ratio of mixture supplied to the engine 11 or the oxygen concentration in the exhaust gas changes, and thereby the output from the exhaust gas sensor 24 changes. Accordingly, the air-fuel ratio F/B correction amount changes in accordance with the above change. The above unusable other fuel includes light oil, kerosene, heavy oil, all of which are generally not used in the engine 11, for example. Thus, in the fuel system abnormality diagnosis by using the air-fuel ratio F/B correction amount, when the air-fuel ratio F/B correction amount widely changes due to the contamination of the other fuel, the air-fuel ratio F/B correction amount may exceed the abnormality determination value even if the fuel system is in a normal state, and thereby misdiagnosis may occur to erroneously determine that there is the abnormality in the fuel system.

For the countermeasure for the above possible misdiagnosis, in the present embodiment, it is determined whether or not unusable other fuel (at least one of light oil, kerosene, heavy oil) contaminates the supply fuel (gasoline) based on knock generating ignition timing. Note that knocking occurs when the engine 11 is operated by the above knock generating ignition timing. When it is determined that the other fuel contaminates the supply fuel, the abnormality determination value for the fuel system is changed to facilitate the determination of the existence of the abnormality in the fuel system. In the above, the abnormality determination value serves as an abnormality determination condition for determining whether there is the abnormality in the fuel system, for example.

Specifically, when the other fuel contaminates the gasoline supplied to the engine 11, knock limit of the ignition timing tends to change toward a timing retarded side in general. In the above, the knock limit of the ignition timing indicates a most advanced ignition timing or a most retarded ignition timing, at which the knock does not occur in the operational state of the engine 11, for example. The above characteristic is considered in the present embodiment. It is determined whether knocking occurs based on the detection signal from the knock sensor 29. Every time it is determined that knocking occurs, the ignition timing at the time of the knocking is stored as knock generating ignition timing, and also the ignition timing is retarded by a certain amount. The above process is repeated, and it is determined whether the knock generating ignition timing becomes more retarded than the predetermined determination value. In other words, it is determined whether the knock generating ignition timing become to indicate a value on the retarded side of the predetermined determination value. In the above, the predetermined determination value is the most retarded timing value (limit value toward the retarded side) of the knock generating ignition timing in a case, where a normal gasoline is supplied, for example. When the knock generating ignition timing becomes more retarded than the determination value, it is determined that other fuel (light oil, kerosene, heavy oil, etc) contaminates. Thus, it is accurately determine whether other fuel contaminates, and thereby when other fuel contaminates, the contamination of the other fuel is able to be detected at an early stage.

Further, the knock limit changes in accordance with the contamination ratio of the other fuel, and thereby the knock generating ignition timing tends to change accordingly in general. Based on the above characteristic, when it is determined that the other fuel contaminates the supply fuel, the contamination ratio of the other fuel is estimated based on the knock generating ignition timing.

Figure 2:
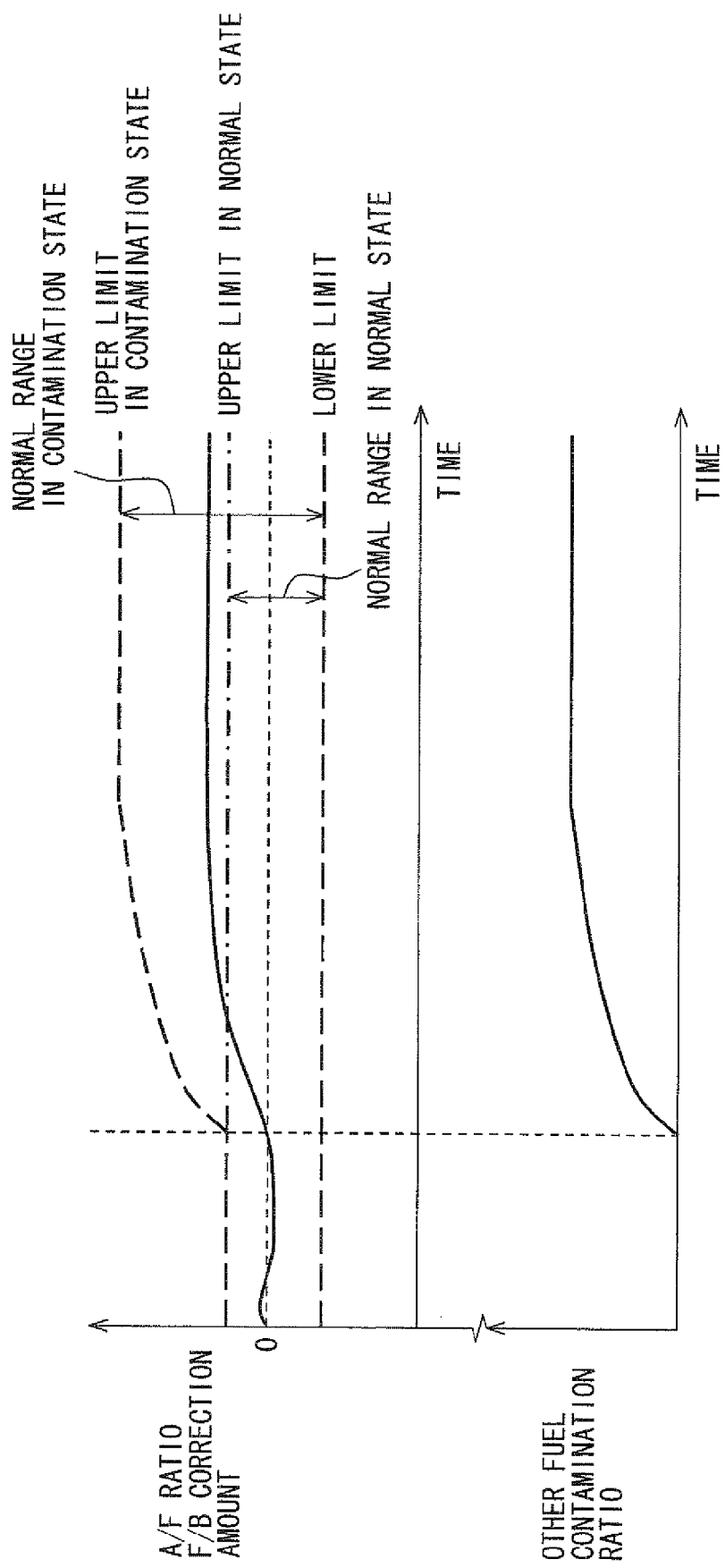
FIG. 2 is a timing chart showing an execution example of an abnormality diagnosis in a fuel system according to the first embodiment.

Then, as shown in the timing chart of FIG. 2, when it is determined that the other fuel contaminates the supply fuel, it is accordingly determined that the air-fuel ratio F/B correction amount is changed by the fluctuation of the output from the exhaust gas sensor 24 (the air-fuel ratio estimated based on the exhaust gas) caused by the contamination of the other fuel. Thus, the abnormality determination value for the fuel system is changed in accordance with the contamination ratio of the other fuel such that the normal range for the air-fuel ratio F/B correction amount is widen, for example, as shown in FIG. 2. As a result, the abnormality in the fuel system is made harder to be determined. Further, when the contamination ratio of the other fuel becomes greater than a predetermined value, the air-fuel ratio F/B correction amount widely changes. Thus, in the above case, the abnormality diagnosis of the fuel system is prohibited. Due to the above, misdiagnosis of erroneously determining the normal state of the fuel system as abnormal is prevented in advance. Specifically, the abnormally-changed air-fuel ratio F/B correction amount due to the change of the output from the exhaust gas sensor 24 (the air-fuel ratio estimated based on the exhaust gas), which output is changed by the contamination of the other fuel, is prevented from being determined as abnormal state of the fuel system or as the existence of abnormality in the fuel system even though the fuel system is in the normal state.

Routines of FIG. 3 and FIG. 4 executed by the ECU 37 will be described below.

[Fuel System Abnormality Diagnosis Routine]

A fuel system abnormality diagnosis routine shown in FIG. 3 is executed by a predetermined interval while the power of the ECU 37 is on, and the fuel system abnormality diagnosis routine serves as abnormality diagnosis unit. When the present routine is activated, firstly, at step 101, it is determined whether the air-fuel ratio F/B control is being executed. When the air-fuel ratio F/B control is not being executed, the present routine is ended without executing the process associated with the abnormality diagnosis at step 102 and later.

In contrast, when it is determined at step 101 that the air-fuel ratio F/B control is presently being executed, the process associated with the abnormality diagnosis at step 102 and later is executed as below. Firstly, at step 102, an other fuel contamination determination routine (described later) in FIG. 4 is executed for determining whether the unusable other fuel (light oil, kerosene, heavy oil, etc) contaminates the supply fuel (gasoline). When it is determined that the other fuel contaminates the supply fuel, the contamination ratio of the other fuel is estimated.

Then, control proceeds to step 103, where it is determined whether the other fuel contaminates based on the determination result of the other fuel contamination determination process at step 102. When it is determined that the other fuel does not contaminate, control proceeds to step 104, where it is determined whether the air-fuel ratio F/B correction amount exceeds the abnormality determination value. In other words, it is determined whether the air-fuel ratio F/B correction amount is greater than an upper limit abnormality determination value, and also whether the air-fuel ratio F/B correction amount is smaller than a lower limit abnormality determination value. It should be noted that the upper limit abnormality determination value may be set as, for example, an upper limit value (positive value) for the air-fuel ratio F/B correction amount while the fuel system is in a normal state. Also, the lower limit abnormality determination value may be set as, for example, a lower limit value (negative value) for the air-fuel ratio F/B correction amount while the fuel system is in the normal state.

In step 104, when it is determined that the air-fuel ratio F/B correction amount does not exceed the abnormality determination value or when it is determined that the air-fuel ratio F/B correction amount falls within a rage from the lower limit abnormality determination value to the upper limit abnormality determination value, control proceeds to step 105, where it is determined that there is no abnormality in the fuel system, and the present routine is ended.

In contrast, when it is determined in step 104 that the air-fuel ratio F/B correction amount exceeds the abnormality determination value or when it is determined that the air-fuel ratio F/B correction amount is greater than the upper limit abnormality determination value or smaller than the lower limit abnormality determination value, control proceeds to step 106, where it is determined that there is the abnormality in the fuel system. Then, a warning lamp (not shown) mounted in an instrument panel of the driver seat is turned on, and alternatively a warning display member (not shown) of the instrument panel of the driver seat may be caused to display a warning sign to warn the driver. Then, the abnormality information, such as abnormality code, is stored in a rewritable nonvolatile memory of the ECU 37, such as a back-up RAM (not shown). Then, the present routine is ended. In the above, the rewritable nonvolatile memory retains stored data even when the ECU 37 is deenergized, for example.

In contrast, in step 103, when it is determined that the other fuel contaminates, control proceeds to step 107, where it is determined whether the contamination ratio of the other fuel is greater than a predetermined value. It should be noted that the predetermined value is set to correspond to an upper limit value for the contamination ratio of the other fuel, which limit value does not cause misdiagnosis of the fuel system. In step 107, when it is determined that the contamination ratio of the other fuel is equal to or smaller than the predetermined value corresponding to "NO" at step 107, it is determined that misdiagnosis of the fuel system is not generated. Then, control proceeds to step 108, where an abnormality determination value correction coefficient, which corresponds to the present contamination ratio of the other fuel, is computed by referring to a map of an abnormality determination value correction coefficient shown in FIG. 5. By using the above computed abnormality determination value correction coefficient, the upper limit abnormality determination value is corrected such that the upper limit abnormality determination value is changed accordingly to the contamination ratio of the other fuel.

In general, when the contamination ratio of the other fuel becomes larger, the output from the exhaust gas sensor 24 (the air-fuel ratio estimated based on the exhaust gas) changes to indicate a leaner operation (leaner combustion), and thereby the air-fuel ratio F/B correction amount is made to become larger to change the combustion state toward a richer operation (richer combustion). Thus, in the map of the abnormality determination value correction coefficient shown in FIG. 5, as the contamination ratio of the other fuel becomes larger, the abnormality determination value correction coefficient becomes larger, and thereby the upper limit abnormality determination value (the abnormality determination value on the richer limit in the normal range) is made larger. The process in step 108 serves as misdiagnosis prohibition unit.

Then, control proceeds to step 109, where it is determined whether the air-fuel ratio F/B correction amount exceeds the changed abnormality determination value, in other words, it is determined whether the air-fuel ratio F/B correction amount is larger than the upper limit abnormality determination value and whether the air-fuel ratio F/B correction amount is smaller than the lower limit abnormality determination value.

At step 109, when it is determined that the air-fuel ratio F/B correction amount does not exceed the abnormality determination value, in other words, when it is determined the air-fuel ratio F/B correction amount falls within a range from the lower limit abnormality determination value to the upper limit abnormality determination value, control proceeds to step 110, where it is determined that there is no abnormality in the fuel system, and the present routine is ended.

In contrast, when it is determined at step 109 that the air-fuel ratio F/B correction amount exceeds the abnormality determination value or when it is determined that the air-fuel ratio F/B correction amount is larger than the upper limit abnormality determination value or is smaller than the lower limit abnormality determination value, control proceeds to step 111, where it is determined that there is the abnormality in the fuel system. Thus, the warning lamp (not shown) mounted on the instrument panel of the driver seat is turned on, and alternatively the warning display member (not shown) of the instrument panel of the driver seat is caused to display a warning sign to warn the driver. Simultaneously, the abnormality information (abnormality code, etc) is stored in the rewritable nonvolatile memory, such as the back-up RAM (not shown) of the ECU 37, and the present routine is ended.

In contrast, in a case, where it is determined at step 107 that the contamination ratio of the other fuel is larger than the predetermined value, the air-fuel ratio F/B correction amount widely changes, and thereby it is determined that it is better to prohibit the abnormality diagnosis in the fuel system. Thus, specifically, without executing the process at and after step 108, the present routine is ended to prohibit the abnormality diagnosis in the fuel system. The process at step 107 also serve as misdiagnosis prohibition unit.

[Other Fuel Contamination Determination Routine]

The other fuel contamination determination routine shown in FIG. 4 is executed at step 102 of the fuel system abnormality diagnosis routine shown in the FIG. 3, and serves as other fuel contamination determination unit. When the present routine in FIG. 4 is activated, firstly, it is determined at step 201 whether knocking occurs based on the detection signal from the knock sensor 29. When it is determined that the knocking does not occur, without executing the process at and after step 202, the present routine is ended.

When it is determined at step 201 that the knocking occurs, control proceeds to step 202, present ignition timing that causes the present knocking is stored as the knock generating ignition timing, and then control proceeds to step 203, where ignition timing is retarded by a certain amount.

After the above, control proceeds to step 204, where it is determined whether knock generating ignition timing exceeds the determination value to become more retarded than the determination value. It should be noted that the determination value is set as the most retarded timing value (limit value toward the retarded side) of the knock generating ignition timing in a case, where a normal fuel (gasoline) is supplied, or set as a slightly retarded timing value than the above most retarded timing value (near the knock limit), for example.

When it is determined at step 204 that the knock generating ignition timing does not exceed the determination value, control proceeds to step 205, where it is determined that other fuel, such as light oil, kerosene, heavy oil, does not contaminates, or it is determined that another factor other than the contamination of the other fuel causes knocking, and the present routine is ended. As above, every time the knocking is detected, the process (step 202 to 204) is repeated. Specifically, every time the knocking is detected, the ignition timing at the time of knocking is stored as the knock generating ignition timing. Also, after the ignition timing is retarded by a certain amount, it is determined whether the knock generating ignition timing exceeds the determination value.

Then, when it is determined at step 204 that the knock generating ignition timing exceeds the determination value to indicate the retarded timing more retarded than the determination value, control proceeds to step 206, where it is determined that there is contamination of the other fuel (light oil, kerosene, heavy oil, etc). Then, control proceeds to step 207, where the other fuel contamination warning lamp 38 mounted on the instrument panel of the driver seat is tuned on, or the warning display member (not shown) of the instrument panel of the driver seat is caused to display the warning sign of "other fuel contamination" to warn the driver. Thus, the contamination of other fuel is reported to the driver at an early stage.

Figure 6:
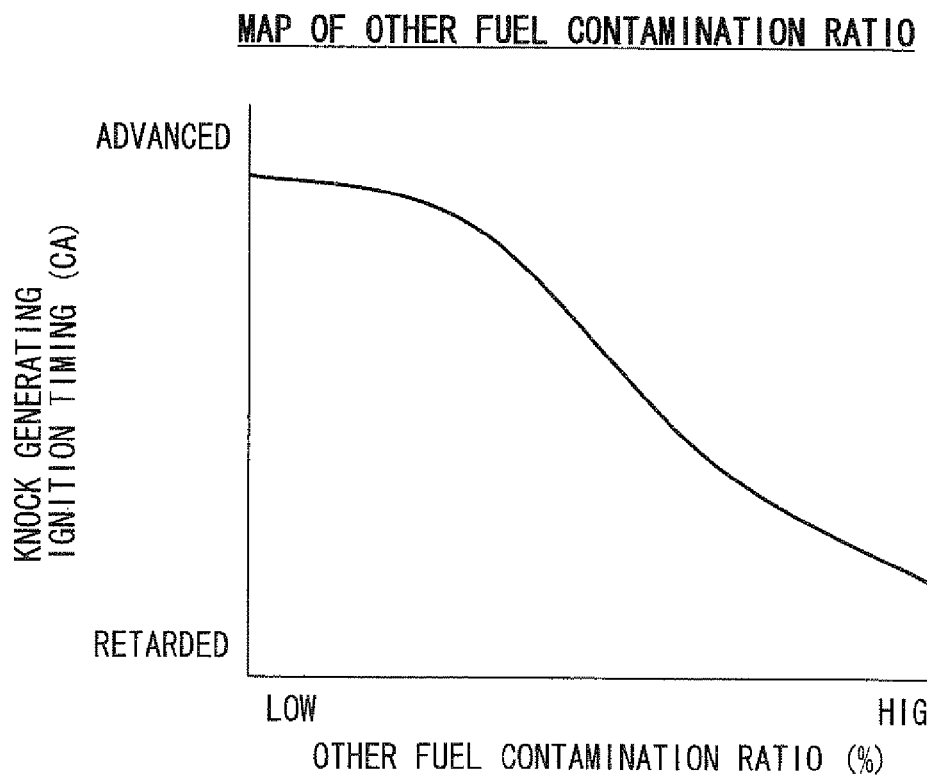
FIG. 6 is a diagram illustrating a concept of one example of a map for an other fuel contamination ratio.

Then, control proceeds to step 208, where the contamination ratio of the other fuel in accordance with the present knock generating ignition timing is computed by referring to the map of the contamination ratio of the other fuel shown in FIG. 6. As the contamination ratio of the other fuel becomes larger, the knock limit tends to change toward the more retarded timing, and thereby the knock generating ignition timing tends to change to indicate the more retarded timing. Thereby, the map of the contamination ratio of the other fuel shown in FIG. 6 is made such that the contamination ratio of the other fuel becomes larger as the knock generating ignition timing changes toward the more retarded timing. The process at step 208 serves as other fuel contamination ratio estimation unit.

Then, when it is determined at step 201 that the knocking has been stopped, it is determined that the ignition timing is more retarded than the most retarded timing value (limit value toward the retarded side) of the knock generating ignition timing, which timing value corresponds to an actual other fuel contamination ratio, and thereby the present routine is ended in order to stop executing the process at and after step 202 (retardation of ignition timing, etc).

In the present first embodiment, when it is determined that other fuel, such as light oil, kerosene, heavy oil, contaminates the gasoline supplied to the engine 11, it is determined that the contamination of the other fuel changes the output from the exhaust gas sensor 24 (the air-fuel ratio estimated based on the exhaust gas ), and thereby changing the air-fuel ratio F/B correction amount. Thus, the abnormality determination value for the fuel system is changed such that it is less likely to determine that there is the abnormality in the fuel system in the above case. In other words, the abnormality determination value for the fuel system is changed such that the abnormality in the fuel system is not determined only because of the change of the air-fuel ratio F/B correction amount caused by the contamination of the other fuel. Thus, the above configuration reliably prevents in advance the misdiagnosis of erroneously determining a specific state as the indication of the abnormality in the fuel system even when the fuel system is in the normal state. In the above specific state, the contamination of the other fuel changes the output from the exhaust gas sensor 24, and thereby changing the air-fuel ratio F/B correction amount.

Also, in the present first embodiment, when the other fuel contaminates the gasoline, the contamination ratio of the other fuel is estimated based on the knock generating ignition timing, and the abnormality determination value for the fuel system is changed in accordance with the estimated contamination ratio of the other fuel. As a result, the abnormality determination value for the fuel system is appropriately changed in accordance with the change of the air-fuel ratio F/B correction amount, which changes accordingly to the contamination ratio of the other fuel. Thus, the misdiagnosis of erroneously determining the abnormality in the fuel system, which error is caused by the contamination of the other fuel, is reliably prohibited in advance.

In general, when the contamination ratio of the other fuel becomes smaller to a certain extent, the influence of the contamination to the combustion state becomes smaller, and thereby change of the output from the exhaust gas sensor becomes substantially smaller. Thus, the influence to the abnormality diagnosis in the fuel system is reduced, and accordingly it is reasonably assumed that the misdiagnosis issue due to the contamination of the other fuel may not occur in the above case. Also, if the abnormality determination condition for determining the abnormality in the fuel system is changed when the contamination of the other fuel is detected, the misdiagnosis caused by the contamination of the other fuel is effectively and substantially prevented in a case, where the contamination ratio of the other fuel is small.

Further, in the present first embodiment, the abnormality diagnosis for detecting the abnormality in the fuel system is prohibited only when the contamination ratio of the other fuel is larger than the predetermined value. As a result, even when the other fuel contaminates the supply fuel, the abnormality diagnosis in the fuel system is able to be executed provided that the contamination ratio is substantially small such that the misdiagnosis of the fuel system is not caused. Thereby, the abnormality in the fuel system is detected at an early stage when the abnormality occurs.

It should be noted that in the above first embodiment, the abnormality determination value for the fuel system is changed in accordance with the contamination ratio of the other fuel. However, the abnormality in the fuel system determination parameter (air-fuel ratio F/B correction amount) may be alternatively changed in accordance with the contamination ratio of the other fuel.

Second Embodiment

Next, with reference to FIG. 7, the second embodiment of the present invention will be described.

In the first embodiment, when it is determined that the other fuel contaminates the supply fuel, the abnormality determination value for the fuel system is changed in accordance with the contamination ratio of the other fuel, and further, when the contamination ratio of the other fuel becomes larger than the predetermined value, the abnormality diagnosis in the fuel system is prohibited. However, by executing a fuel system abnormality diagnosis routine shown in FIG. 7, when it is determined that the other fuel contaminates the supply fuel, the abnormality diagnosis in the fuel system is prohibited such that the misdiagnosis of erroneously determining that there is the abnormality in the fuel system, which misdiagnosis is caused by the contamination of the other fuel, is prevented.

Figure 7:
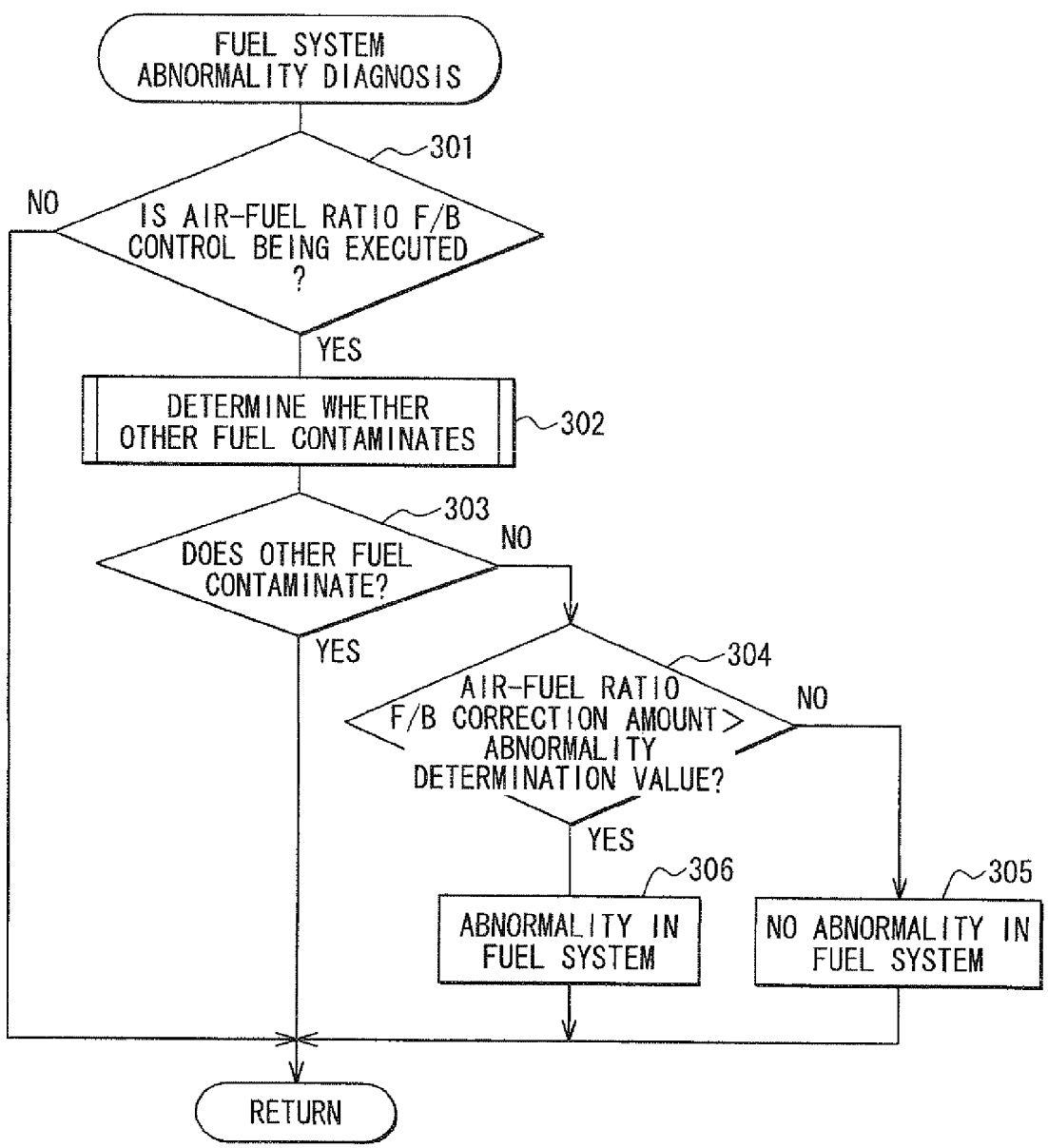
FIG. 7 is a flow chart for explaining a process flow of a fuel system abnormality diagnosis routine according to a second embodiment of the present invention.

In the fuel system abnormality diagnosis routine shown in FIG. 7, when it is determined at step 301 that the air-fuel ratio F/B control is being executed, control proceeds to step 302, where the above other fuel contamination determination routine shown in FIG. 4 is executed to determine whether the other fuel contaminates the supply fuel. When it is determined that the other fuel contaminates the supply fuel, the contamination ratio of the other fuel is estimated.

Then, control proceeds to step 303, where it is determined whether there is the contamination of the other fuel. When it is determined that there is no contamination of the other fuel, control proceeds to step 304, where it is determined whether the air-fuel ratio F/B correction amount exceeds the abnormality determination value. As a result, when it is determined that the air-fuel ratio F/B correction amount does not exceed the abnormality determination value, control proceeds to step 305, where it is determined that there is no abnormality in the fuel system or that the fuel system is in a normal state. In contrast, when it is determined that the air-fuel ratio F/B correction amount exceeds the abnormality determination value, control proceeds to step 306, where it is determined that there is the abnormality in the fuel system.

In contrast, when it is determined at step 303 that there is the contamination of the other fuel, without executing the process at and after step 304, the present routine is ended such that the abnormality diagnosis in the fuel system is prohibited. The process at step 303 also serves as misdiagnosis prohibition unit.

In the above second embodiment, when it is determined that the other fuel contaminates the supply fuel, the abnormality diagnosis in the fuel system is prohibited, Thus, the above configuration reliably prevents in advance the misdiagnosis of erroneously determining a specific state as the indication of the abnormality in the fuel system even when the fuel system is in the normal state. In the above specific state, the contamination of the other fuel changes the output from the exhaust gas sensor 24, and thereby changing the air-fuel ratio F/B correction amount.

It should be noted that in each of the above first embodiment and second embodiment, the air-fuel ratio F/B correction amount is compared with the abnormality determination value to determine whether there is the abnormality in the fuel system. However, a method for conducting the abnormality diagnosis in the fuel system may be changed as required. For example, alternatively, the output from the exhaust gas sensor 24 may be compared with an abnormality determination value to determine whether there is the abnormality in the fuel system. Alternatively, the change amount of the output from the exhaust gas sensor 24 or the change amount of the air-fuel ratio F/B correction amount may be compared with an abnormality determination value to determine whether there is the abnormality in the fuel system.

Also, in each of the above first embodiment and second embodiment, it is determined whether the other fuel contaminates supply fuel based on the knock generating ignition timing. However, a method for determining the other fuel contamination may be changed as required. For example, alternatively, when the other fuel contaminates the supply fuel, the air-fuel ratio estimated based on the exhaust gas, a cylinder pressure, an exhaust gas temperature, and an HC concentration in the exhaust gas change. Thus, it may be determined whether the other fuel contaminates based on any one of the output from the exhaust gas sensor 24, the air-fuel ratio F/B correction amount, the cylinder pressure, the exhaust gas temperature, and the HC concentration in the exhaust gas. Further, the contamination ratio of the other fuel may be estimated based on any one of the output from the exhaust gas sensor 24, the air-fuel ratio F/B correction amount, the cylinder pressure, the exhaust gas temperature, and the HC concentration in the exhaust gas.

Also, in each of the above first embodiment and second embodiment, it is determined whether other fuel, such as light oil, kerosene, heavy oil, contaminates gasoline supplied to the engine 11. However, alternatively, it may alternatively be determined whether alcohol contaminates the gasoline by an amount equal to or greater than a permissible level, and when it is determined that alcohol contaminates the gasoline by the amount equal to or greater than the permissible level, the abnormality determination condition in the fuel system may be changed or an abnormality diagnosis in the fuel system may be prohibited.

Also, the present invention is not limited to the intake port injection engine shown in FIG. 1. However, the preset invention may be applied to a cylinder injection engine or to a dual injection engine having a fuel injection valve for the intake port injection and a fuel injection valve for the cylinder injection.

Further, the above embodiment may be alternatively applied to a diesel engine that uses light oil as fuel. In the above alternative case, when it is determined that gasoline, which is unusable other fuel for the diesel engine, has contaminated light oil supplied to the diesel engine, an abnormality determination condition in the fuel system may be changed or the abnormality diagnosis in the fuel system may be prohibited.

Also, the present invention may be applied to a bi-fuel engine that is able to use any fuel of gasoline, alcohol, and alcohol-mixed fuel, which has alcohol mixed into gasoline. In the above configuration, the light oil, kerosene, and heavy oil are not usable, and thereby when it is determined that light oil, kerosene, or heavy oil, which are unusable other fuel, contaminates fuel supplied to the engine, the abnormality determination condition for determining the abnormality in the fuel system may be changed, or the abnormality diagnosis in the fuel system may be prohibited.

Additional advantages and modifications will readily occur to those skilled in the art. The invention in its broader terms is therefore not limited to the specific details, representative apparatus, and illustrative examples shown and described.

What is claimed is:

1. An abnormality diagnosis apparatus for an internal combustion engine comprising:
    an abnormality diagnosis unit that determines whether there is an abnormality in a fuel system based on an output from an exhaust gas sensor mounted on an exhaust duct of the internal combustion engine;
    an other fuel contamination determination unit that determines whether an other fuel contaminates a supply fuel, which is supplied to the internal combustion engine; and
    a misdiagnosis prohibition unit that conducts one of (a) changing an abnormality determination condition used in determination of whether there is the abnormality in the fuel system and (b) prohibiting the abnormality diagnosis unit from determining whether there is the abnormality in the fuel system, when the other fuel contamination determination unit determines that the other fuel contaminates the supply fuel.

2. The abnormality diagnosis apparatus according to claim 1, further comprising:
    an air-fuel ratio feed-back control unit that feedback corrects a fuel injection quantity by an air-fuel ratio feed-back correction amount based on the output from the exhaust gas sensor such that an air-fuel ratio estimated based on exhaust gas matches with a target air-fuel ratio, wherein:
    the abnormality diagnosis unit determines whether there is the abnormality in the fuel system based on the air-fuel ratio feed-back correction amount used by the air-fuel ratio feed-back control unit.

3. The abnormality diagnosis apparatus according to claim 1, further comprising:
    an other fuel contamination ratio estimation unit that estimates a contamination ratio of the other fuel when the other fuel contamination determination unit determines that the other fuel contaminates the supply fuel, wherein:
    the misdiagnosis prohibition unit changes the abnormality determination condition of the fuel system based on the contamination ratio of the other fuel estimated by the other fuel contamination ratio estimation unit.

4. The abnormality diagnosis apparatus according to claim 3, where:
    the misdiagnosis prohibition unit prohibits the abnormality diagnosis unit from determining whether there is the abnormality in the fuel system when the estimated contamination ratio of the other fuel is greater than a predetermined value.

5. The abnormality diagnosis apparatus according to claim 1, wherein:
    the internal combustion engine is a gasoline engine that uses gasoline as fuel; and
    the other fuel contamination determination unit determines whether at least one of light oil, kerosene, and heavy oil as the other fuel contaminates the supply fuel.

* * * * *